Sept. 20, 1960     F. P. BARTH     2,953,075
PHOTOGRAPHIC SHUTTER WITH "B" EXPOSURE
Filed July 31, 1956
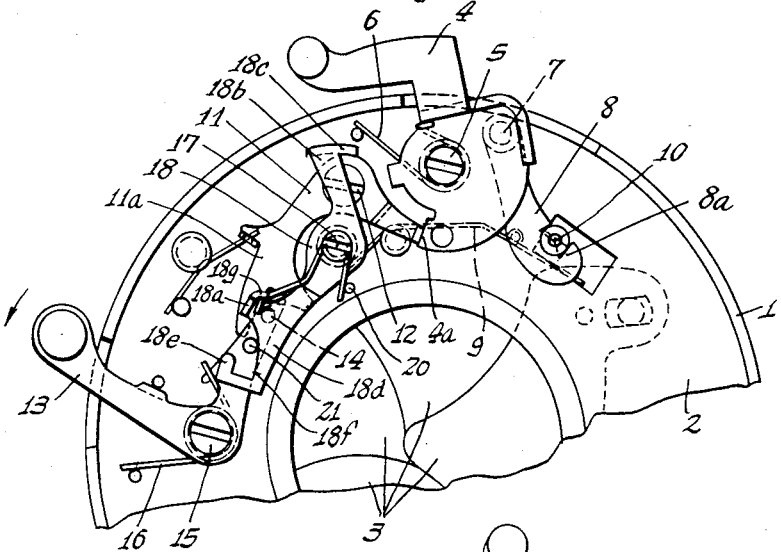
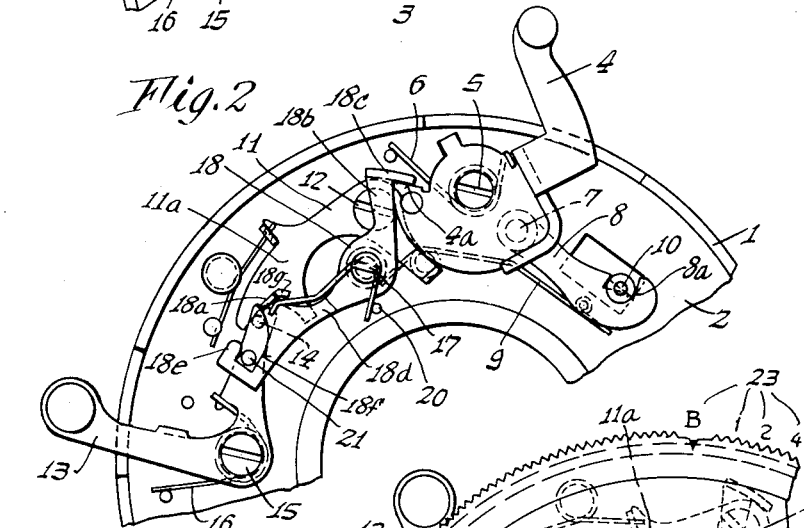
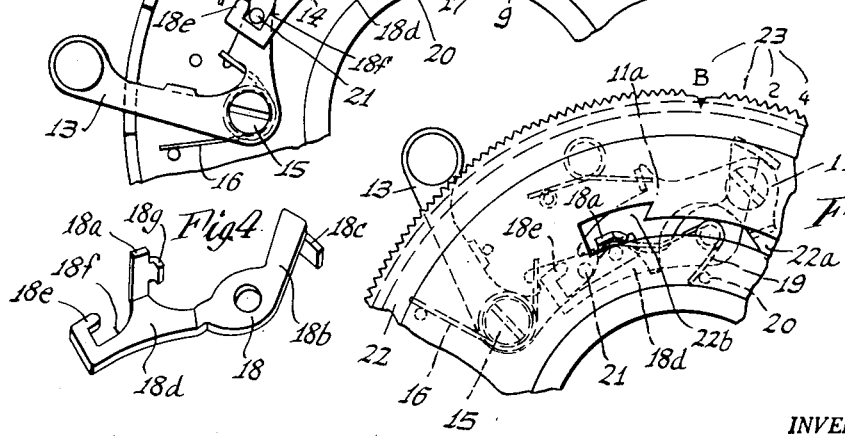
INVENTOR.
*Fritz P. Barth*
BY
*Munn, Liddy, Daniels & March*
ATTORNEYS United States Patent Office 2,953,075
Patented Sept. 20, 1960

2,953,075

PHOTOGRAPHIC SHUTTER WITH "B" EXPOSURE

Fritz P. Barth, Calmbach, Enz, Germany, assignor to Alfred Gauthier G.m.b.H., Calmbach, Enz, Germany, a corporation of Germany Filed July 31, 1956, Ser. No. 601,170

Claims priority, application Germany Aug. 12, 1955

2 Claims. (Cl. 95—63)

This invention relates to photographic shutters, and more particularly to photographic shutters of the type provided with which is known as "B" or bulb exposure mechanisms.

Heretofore, in certain shutters provided with means by which a bulb exposure may be had, the mechanism for effecting the bulb exposure was not wholly reliable over an extended period of use. After a certain number of actuations of such bulb exposure mechanism, malfunctioning of the same would occur, due to deficiencies in the mounting for the shutter. Such malfunctioning would prevent the shutter driving member from being properly held in the position corresponding to the full-open condition of the shutter blades, even though the operator properly actuated the shutter release with the camera setting in the position "B." The improper operation instead was characterized by the shutter mechanism passing through its complete cycle of operation, without being halted when the shutter blades became fully open, and as a consequence there resulted an instantaneous exposure instead of the desired delayed or bulb exposure.

An object of the present invention is to provide a novel and improved photographic shutter with bulb mechanism, which is so constituted and organized that the said mechanism is reliable at all times and throughout an extended period of use, being characterized by foolproof operation wherein the desired delay of the shutter is always guaranteed.

This is accomplished, in accordance with the invention, by the provision of a novel, movable member or element which is adapted to be actuated by the shutter release, such element being arranged to interrupt and positively block the shutter blade driving mechanism in the position thereof which corresponds to the fully-open condition of the shutter blades. The said element or member may be either actuated directly or indirectly in response to actuation of the shutter release by the operator.

Moreover, said member or element as provided by this invention may be advantageously constituted as a two-armed lever which is under the influence of a spring and which has one arm arranged to block or halt a part of the shutter blade driving mechanism, for example the shutter drive member, the second arm of the lever being connected by a positive drive with the shutter release, to be actuated in response to operation of such release by the operator.

In order to obtain the simplest possible construction of the shutter, the second arm of the two-armed lever is made in the form of a U-shaped hook, which cooperates with a pin or lug provided on the shutter release.

Therefore, a feature of the invention resides in the provision of an improved control means for effecting reliable bulb operation of the shutter at all times, which control means is characterized by extreme simplicity and low manufacturing cost.

Other features and advantages will hereinafter appear.

In the drawings accompanying this specification, similar characters of reference indicate corresponding parts wherever possible in the several views, in which:

Figure 1 is a fragmentary elevational view of a photographic intra-lens shutter provided with a bulb exposure mechanism in accordance with the invention. The exposure-time setting ring has been removed, and the shutter is shown in its cocked position.

Fig. 2 is a view like Fig. 1, but with the shutter released for a bulb exposure, the control means for effecting such exposure being shown as operative and as having been actuated by the shutter release. For the purpose of clarity, the shutter blades, which are in fully-open position, are not illustrated in Fig. 2.

Fig. 3 is a fragmentary view of the shutter of Fig. 1 but with the exposure-time setting ring in place.

Fig. 4 is a perspective view of the two-armed lever comprising the control means for effecting reliable bulb exposures, as provided by the invention.

As shown, the improved photographic shutter of this invention comprises a housing 1 having a base plate 2 which carries the usual shutter blade ring, said ring however not being shown for reasons of clarity of illustration. The said shutter blade ring operates in the well-known manner to actuate the usual shutter blades 3. A shutter driving member is provided, in the form of a cocking lever 4 which is pivotally carried by a pivot screw 5 and is influenced by a drive spring 6. The shutter driving member 4 has a pivot 7 on which there is pivotally carried a latch 8 influenced by a spring 9. The latch 8 has a mouth 8a engageable with a pin 10 carried by the shutter blade ring, and the action of the latch 8 and spring 9 are well understood in the art.

The shutter driving member 4 is held in the well known manner in its cocked position by an arresting lever 11 which is pivotal about an axis 12 and has a long arm 11a connected with a shutter release lever 13 by means of a pin 14 carried on the latter. The shutter release 13 is pivoted on a pivot screw 15 and is influenced by a spring 16.

In accordance with the present invention there is provided a novel and improved control means for effecting reliable bulb operation of the shutter blades at all times, said control means comprising a movable member or element arranged to interrupt and positively block the shutter blade driving mechanism in a position thereof which corresponds to the full-open position of the shutter blades, and said element or member being thereafter again actuated to free said driving mechanism in response to reverse movement of the shutter release, thereby to enable the shutter to be again closed by completion of movement of the driving mechanism.

In the embodiment of the invention illustrated herein this member or element comprises a two-armed lever 18 which is shiftable about a pivot axis 17 and is influenced by a spring 19, to be normally continually urged in a clockwise direction by such spring. The lever 18 is shown per se in Fig. 4, said lever having an upstanding lug 18a for engagement with one end of the biasing spring 19. The other end of the spring 19 engages a pin 20 fixed to the base plate 2 of the shutter.

The lever 18 has an arm 18b provided with a bent extremity or lug 18c which is so arranged as to constitute an abutment for engagement with a nose portion 4a of the shutter driving member 4 for the bulb setting of the shutter. Such engagement and blocking is clearly illustrated in Fig. 2, wherein the shutter drive member 4 is held in a position corresponding to the fully-open condition of the shutter blades 3. The lever 18 has a second lever arm 18d which is connected with the shutter release lever 13 for actuation thereby.

The connection between the lever arm 18d and the shutter release 13 may be effected in a simple and reliable, positive manner, and with a minimum expenditure of parts and labor, by forming the end of the arm 18d into a U-shaped hook indicated at 18e, said hook being engageable with a pin 21 mounted on the shutter release 13. The pin 21 serves simultaneously as a point of contact for a guiding or camming edge 18f of the lever arm 18d, such edge terminating at the lug 18a, 18g which is engaged by the spring 19.

Fig. 3 illustrates an exposure-time setting ring 22 having slots 22a and 22b adapted to receive the lug 18a of the lever 18. When the setting ring 22 is placed for bulb exposure, as indicated in Fig. 3 by the index mark 22d in conjunction with the scale 23, the arm 18a of the lever 18 will be in the groove 22b, and due to the great width of this groove there will be permitted shifting of the lever 18 into the blocking position shown in Fig. 2 whereby the shutter blades are halted in fully-open position. However, when the exposure-time setting ring 22 is shifted for an instantaneous exposure, the arm 18a of the lever 18 will be in the narrow groove 22a, thus preventing shifting of the lever 18 from the Fig. 1 position. Thus the lever 18 may not be actuated by the spring 19 to block the movement of the shutter driving member 4. Operation of the improved control means of this invention is as follows:

In order to cock the shutter the cocking lever 4 is moved in a counterclockwise direction to the position shown in Fig. 1, and the various parts cooperable with the cocking lever are brought into their respective positions by such movement, as clearly illustrated in this figure.

In order to release the shutter for a bulb exposure, the setting ring 22 is placed in the position "B" shown in Fig. 3, and then the release lever 13 is moved in counterclockwise direction, as indicated by the arrow in Fig. 1. Upon this occurring the spring 19 will cause the lever 18 and especially the arm 18d thereof to follow the pin 21 of the release lever 13, such pin travelling along the camming edge 18f. After a certain amount of movement of the lever 13 and prior to its release of the driving member 4, the pin 21 will leave the camming edge 18f and engage the hook bill 18e, thereby effecting a unidirectional, positive driving connection between the lever 18 and the shutter release 13. At the same time the lug 18c of the lever 18 will have shifted into the path of travel of the nose 4a of the driving lever 4.

In the well-known manner, as the movement of the shutter release 13 is continued, the lever 11 will become disengaged from the locking nose 4a of the drive member 4, whereupon the latter will snap in a clockwise direction, opening the shutter blades 3 to their fully-open positions. The nose 4a will thereupon strike the lug 18c of the lever 18, halting the driving member 4, and the shutter parts will then have the positions shown in Fig. 2, with the shutter blades fully open. The operator maintains downward pressure on the shutter release 13 for the desired period of time, keeping the shutter blades fully open, until the sought exposure is effected. It will be noted that for such act, the lever 18 held, by means of the pin 21 of the shutter release 13 and the bill 18e of the U-shaped hook, in its blocking position positively preventing continued movement of the drive member 4. In other words, the latter is positively arrested by the lug 18c due to the connection effected between the pin 21 and bill 18e of the lever 18.

It will be readily understood that if, instead of providing the bill 18e on the hook, reliance were placed upon originally adjusted proportions of cooperation between the nose 4a and the lug 18c there would not ensue the reliability in the bulb mechanism, and after a certain number of bulb exposures the nose 4a of the drive member 4, in striking the lug 18c could exert a turning movement on the lever 18, causing such lever inadvertently to shift counterclockwise and prematurely release the drive member 4. Thus the bulb setting would fail in its function, and there would occur virtually an instantaneous exposure instead of the desired bulb exposure.

However, in accordance with this invention by the provision of the hook bill 18e there is effected a positive unidirectional driving connection between the lever 18 and the shutter release 13, and as long as the operator halts the latter in its downward position there will be positively prevented any movement of the lever 18 which might allow the drive member 4 to escape and complete the shutter closing movement. Thus misexposures are prevented, and there is effected the utmost reliability of operation throughout a long extended use of the shutter.

Upon the operator releasing the shutter release 13, the same will return under the action of the spring 16 to its starting position as shown in Fig. 1. Here the pin 21 presses against the camming edge 18f of the lever 18 so that the lever is shifted counterclockwise and the lug 18c is disengaged from the locking nose 4a of the shutter drive member 4. The drive member upon such release will be driven clockwise by the spring 6, thus effecting the closing of the shutter blades 3 in the well-known manner.

In the illustrated embodiment of the invention, the element which serves to arrest the shutter blade driving mechanism, namely the lever 18, is positively held in its operative arresting position by the shutter release 13. It will be readily understood that a similar positive action may be obtained, depending on the disposition of the shutter components, through the action of intermediate members, such members having positive driving connections with both the lever 18 and the shutter release lever 13 insofar as preventing counterclockwise turning of the lever 18 is concerned when the said lever is in its arresting position.

It will be understood further that for the "B" setting of the ring 22, providing for a bulb exposure, the shutter blade driving mechanism is arrested in a position corresponding to the full-open position of the shutter blades 3, and that such arresting is effected in a positive manner by means coupled to the release lever 13.

An important feature of the present invention resides in the extreme simplicity of the control device comprising the lever 18, by which there is insured positive and reliable bulb actuation of the shutter blades, and the low cost and economy of manufacture represented by such member.

Variations and modifications may be made within the scope of the claims and portions of the improvements may be used without others.

I claim:

1. In a photographic device, a shutter having provision for bulb exposure, a spring charged shutter blade drive mechanism including a movable member connected to the shutter blades and having different positions corresponding to cocked and fully opened positions of the shutter, a manually operable shutter release device for holding said movable member in the position corresponding to the cocked condition of the shutter, the operation of said shutter release device freeing said member for spring charged movement of said member and the blades to shutter opened position, said shutter release device including a movable finger engageable member having a cocked position and automatic means comprising a movable part having a rest position in which it is out of contact with said member, said movable part having a projection, a corresponding projection on said member, the movable part projection being movable into engagement with said corresponding projection on said member when said shutter is fully opened to retain the shutter in fully opened position, means normally urging said movable part projection into said engagement, said finger engageable member having a projection normally operative to retain said movable part in said rest position but being movable to release said movable part for movement of the latter toward engagement with said member, said finger engageable member projection having a path of movement during operation to release said movable member, said movable part having a hook-like element, said means urging movement of said movable part projection into engagement with said movable member projection being operable to urge said hook-like element of said movable part into said path of movement of said projection of said finger engageable member during movement of the latter to release the first mentioned movable member and upon release of said movable part by said finger engageable member, said projection on said finger engageable member being operable to engage said movable part hook-like element when the latter is in said path of movement and being further operative upon continued movement of said finger engageable member to release the first mentioned member after engagement of the latter with said hook-like element to force said movable part projection into contact with the first mentioned member projection to maintain the latter member in shutter opened position, said shutter further comprising an adjustable setting means adjustable to retain said movable part in said rest position independent of said finger engageable member, the latter means being selectively movable to release said movable part from restraining relationship therewith, the finger engageable member projection being freely movable through said path to release said blades and movable member independently of said movable part when the latter is retained by said setting means.

2. In a photographic shutter, a spring charged shutter blade driving member, shutter blades, means connecting said spring charged blade driving member to said shutter blades, said member having shutter closed positions and a shutter open position, means for cocking said spring charged member, release means for locking said spring charged member in cocked position and for releasing said spring charged member to drive said blades from closed position to open position and back to closed position, said release means including a finger engageable member, said driving member having a projection, stop means, said stop means having a projection and a rest position and being movable out of said rest position to move the latter projection into engagement with the projection of the spring charged driving member when the latter is in shutter opened position for locking the latter and said blades in shutter open position, means continuously urging the stop means projection into said engagement with the driving member projection, adjustable setting means selectively adjustable to maintain said stop means projection out of contact with said spring charged driving member projection or to release said stop means for movement of its projection by said urging means into engagement with said spring charged member projection, abuttable retaining means on said release means contacting said stop means and operable to retain the latter in said rest position when said spring charged driving member is in cocked position, said abuttable retaining means being movable with said release means during release of said spring charged means to release said stop means from retaining connection therewith for movement of said stop means projection into engagement with said spring charged member projection and second abuttable means on said release means, abuttable means on said stop means adapted to cooperate with the second abuttable means on said release means, and engageable with said second abuttable means during continued movement of said release means and said stop means after release of said spring charged driving member and said stop means for forced movement of said stop means projection into engagement with said spring charged member projection by said release means.

References Cited in the file of this patent

UNITED STATES PATENTS

| | | |
|---|---|---|
| 372,857 | Lewis | Nov. 8, 1887 |
| 761,756 | Brueck | June 7, 1904 |
| 2,267,518 | Burger | Dec. 23, 1941 |
| 2,448,876 | Fuerst | Sept. 7, 1948 |